July 21, 1953 F. H. JENSEN 2,645,812
FISH FILLET SPLITTING AND SKINNING MACHINE
Filed May 2, 1947 8 Sheets-Sheet 1

INVENTOR.
Frederick H. Jensen
BY
ATTORNEY

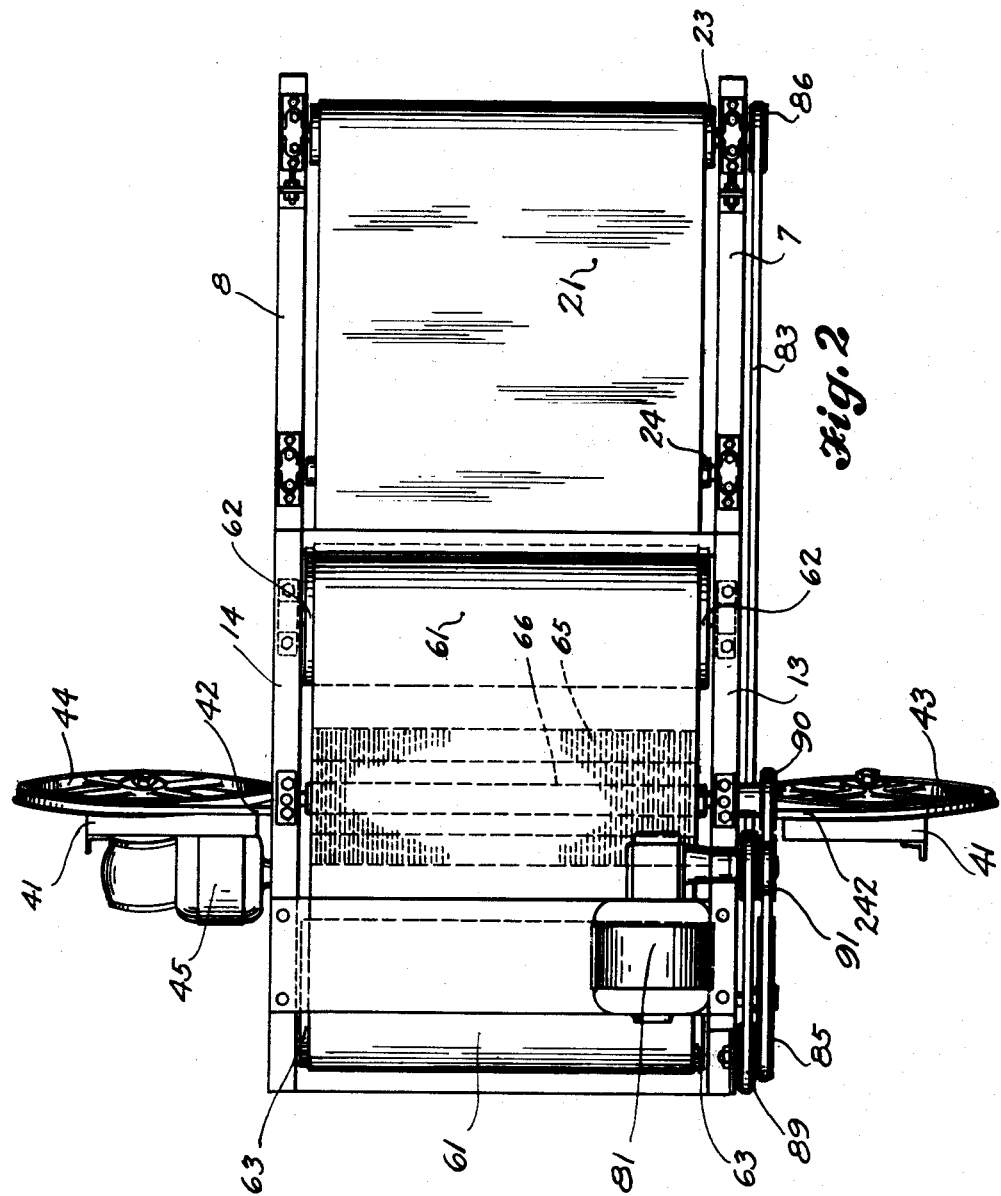

July 21, 1953     F. H. JENSEN     2,645,812
FISH FILLET SPLITTING AND SKINNING MACHINE
Filed May 2, 1947     8 Sheets-Sheet 3
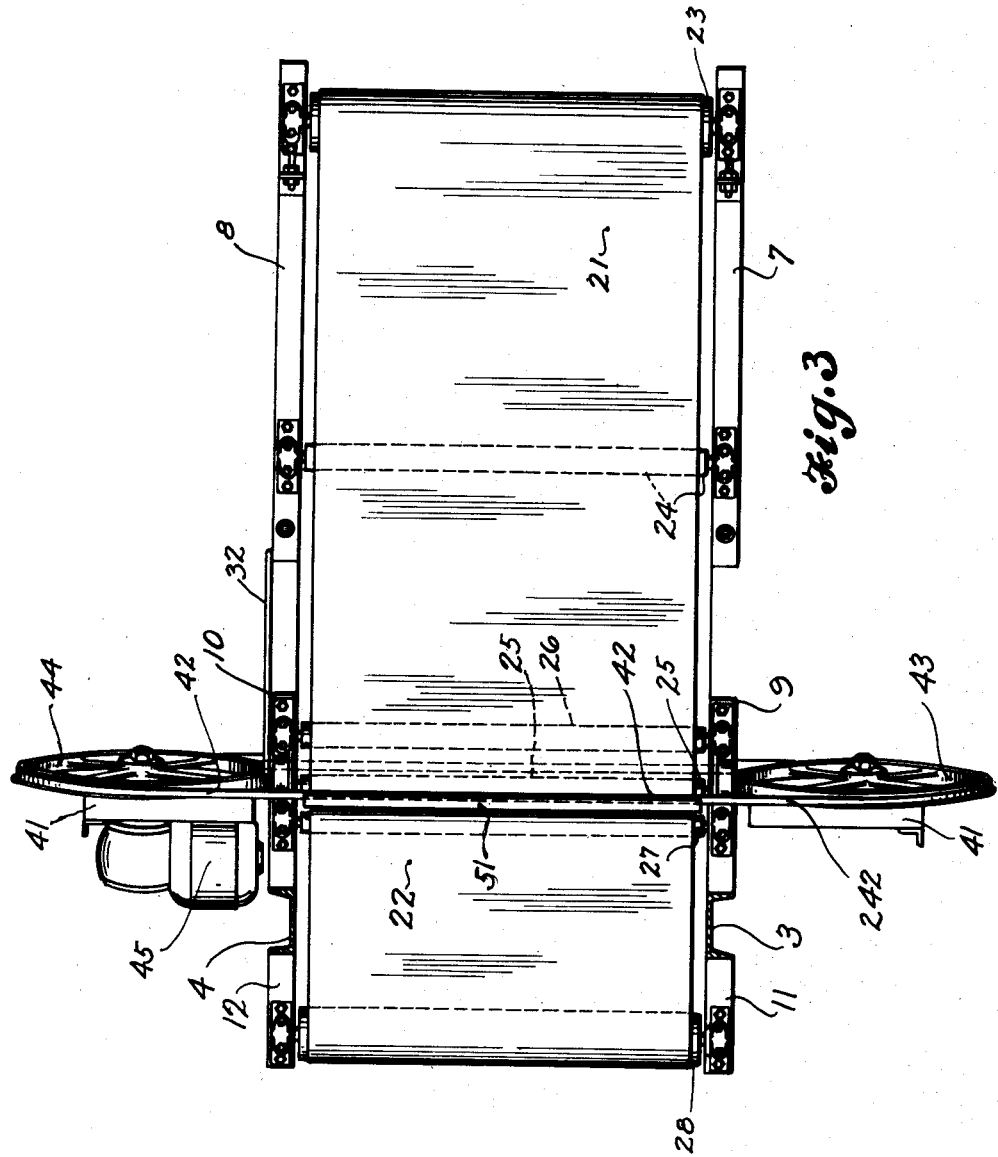
INVENTOR.
Frederick H. Jensen
BY
Paul Bliven
ATTORNEY

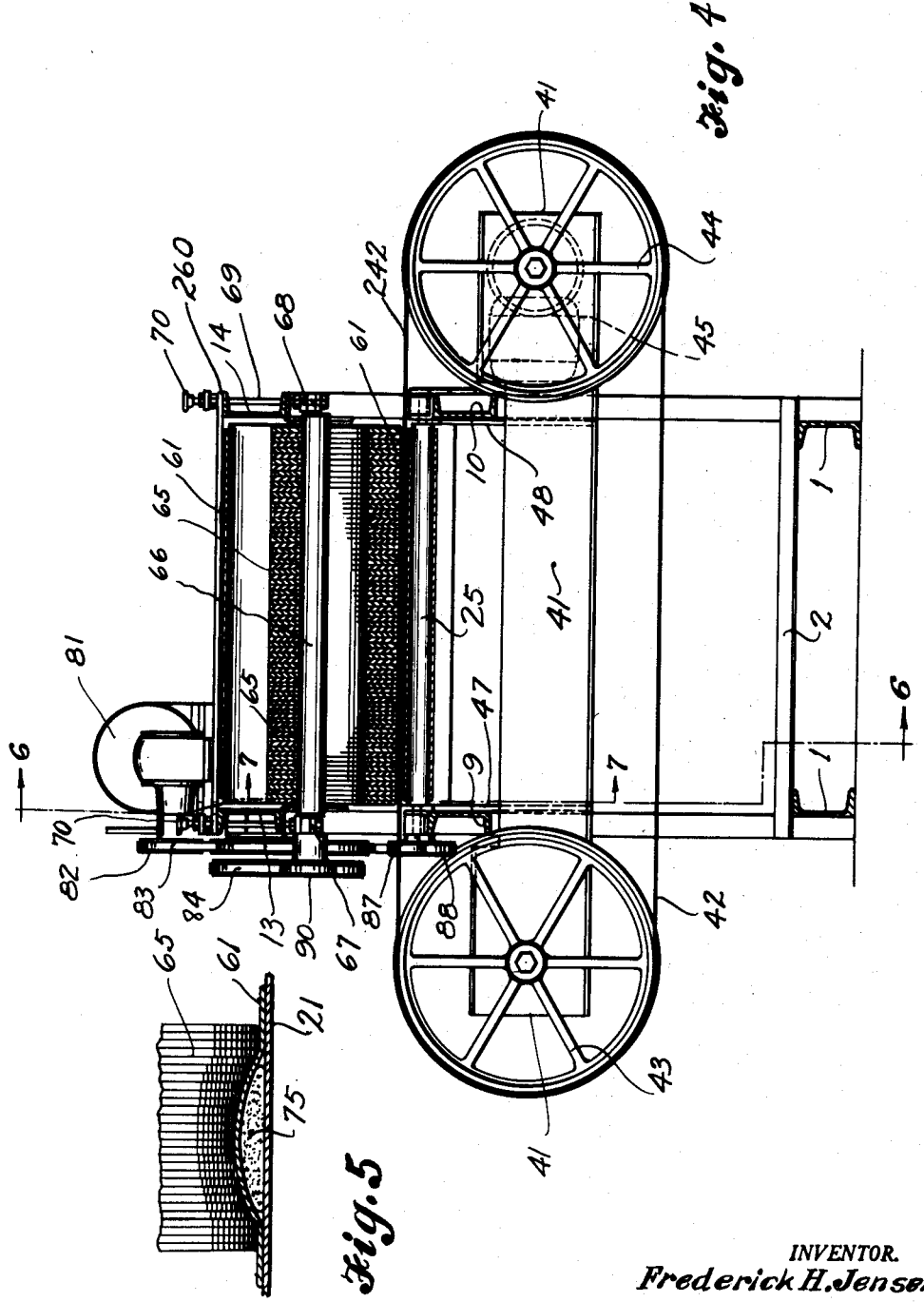

July 21, 1953 F. H. JENSEN 2,645,812
FISH FILLET SPLITTING AND SKINNING MACHINE
Filed May 2, 1947 8 Sheets-Sheet 5
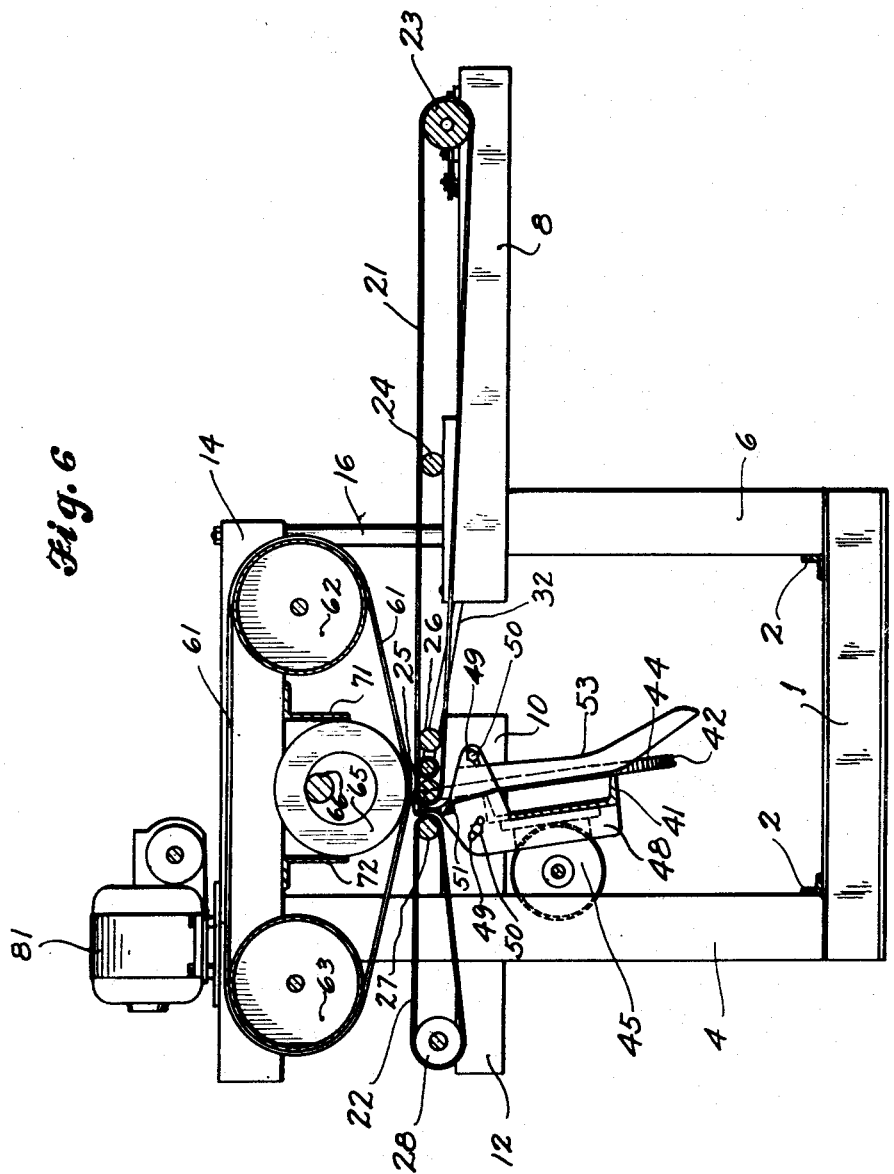
INVENTOR.
*Frederick H. Jensen*
BY
*Paul Bliven*
ATTORNEY

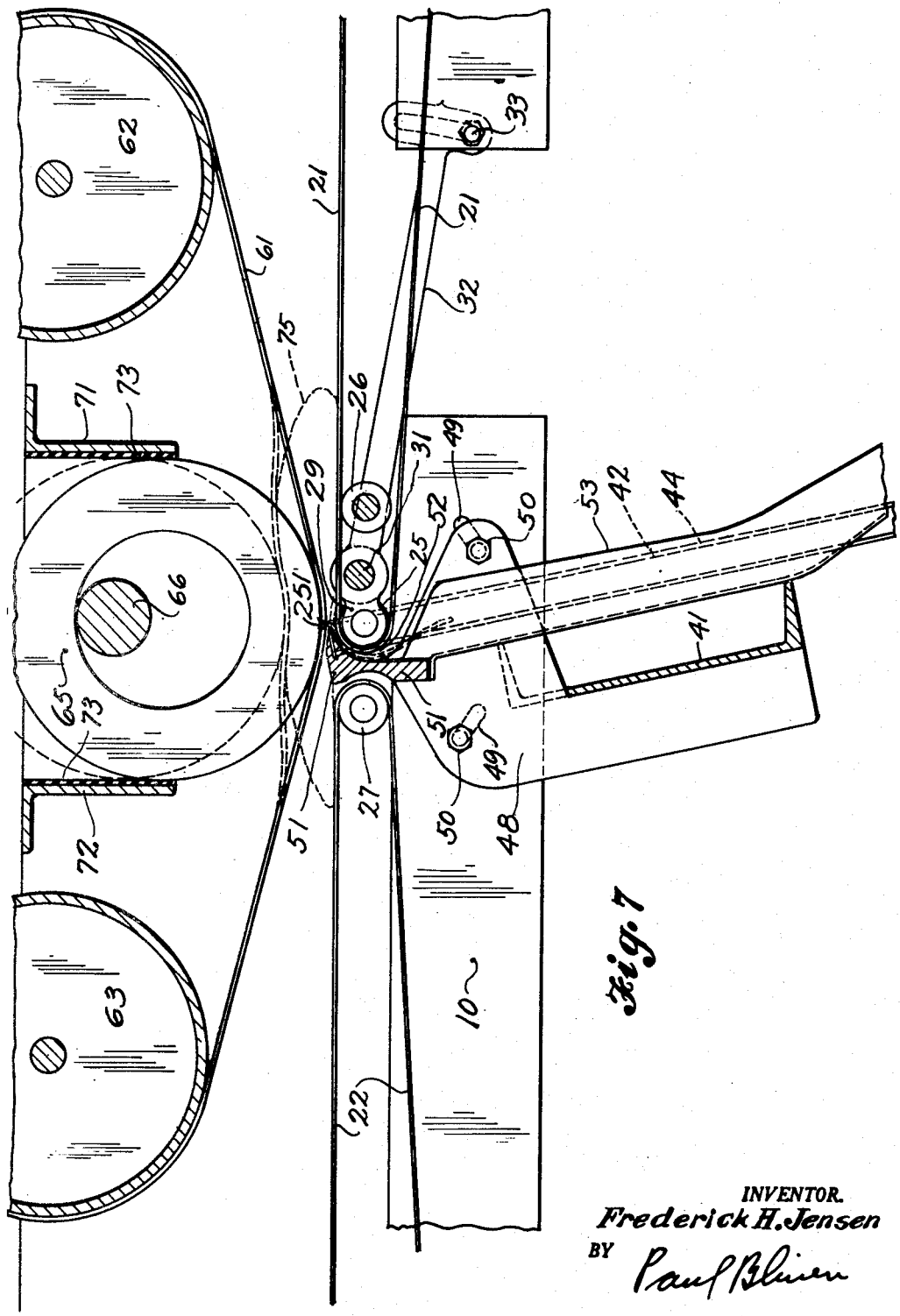

July 21, 1953  F. H. JENSEN  2,645,812
FISH FILLET SPLITTING AND SKINNING MACHINE
Filed May 2, 1947  8 Sheets-Sheet 7
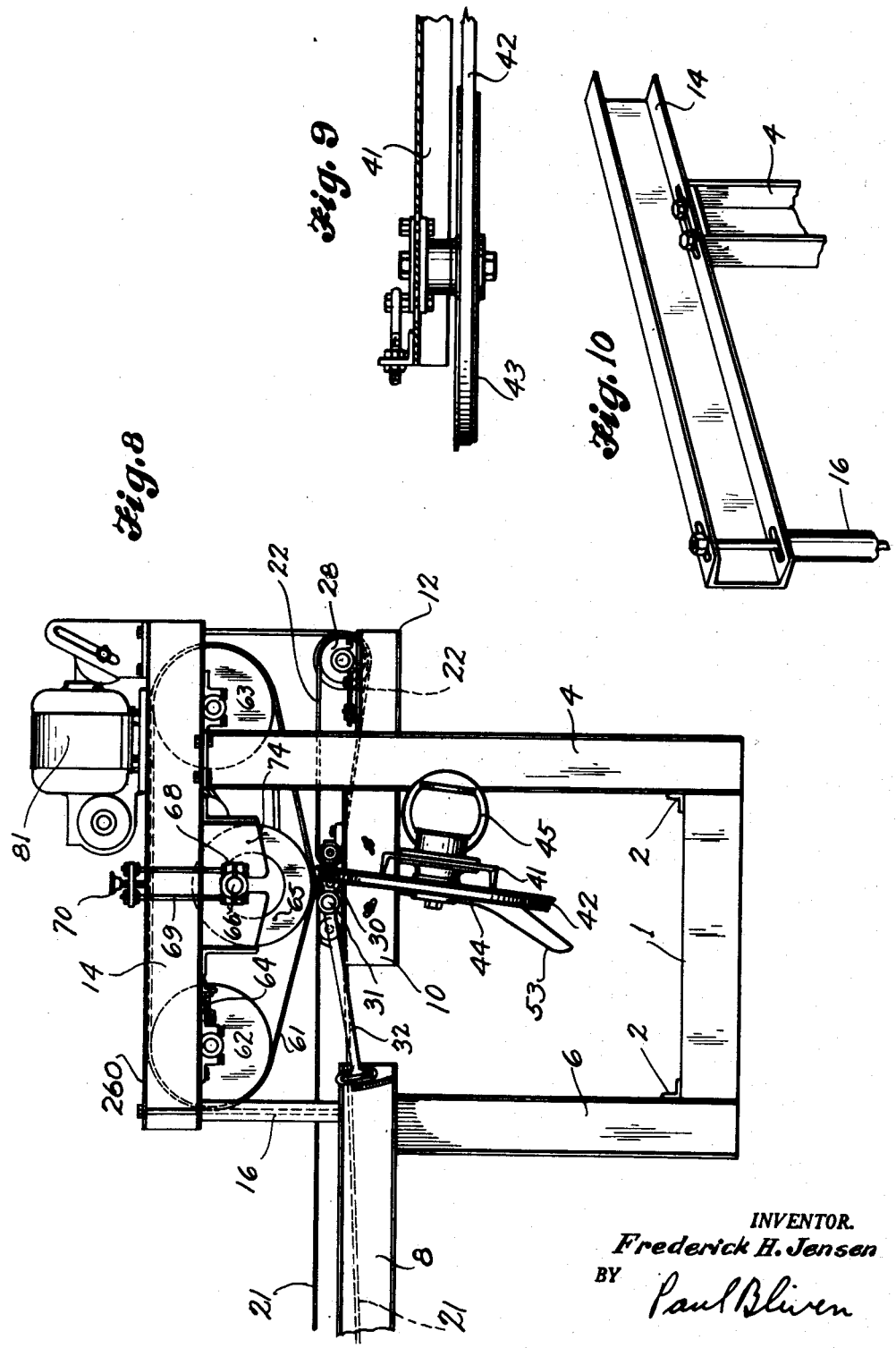
INVENTOR.
Frederick H. Jensen
BY Paul Bliven
ATTORNEY July 21, 1953 F. H. JENSEN 2,645,812
FISH FILLET SPLITTING AND SKINNING MACHINE
Filed May 2, 1947 8 Sheets-Sheet 8
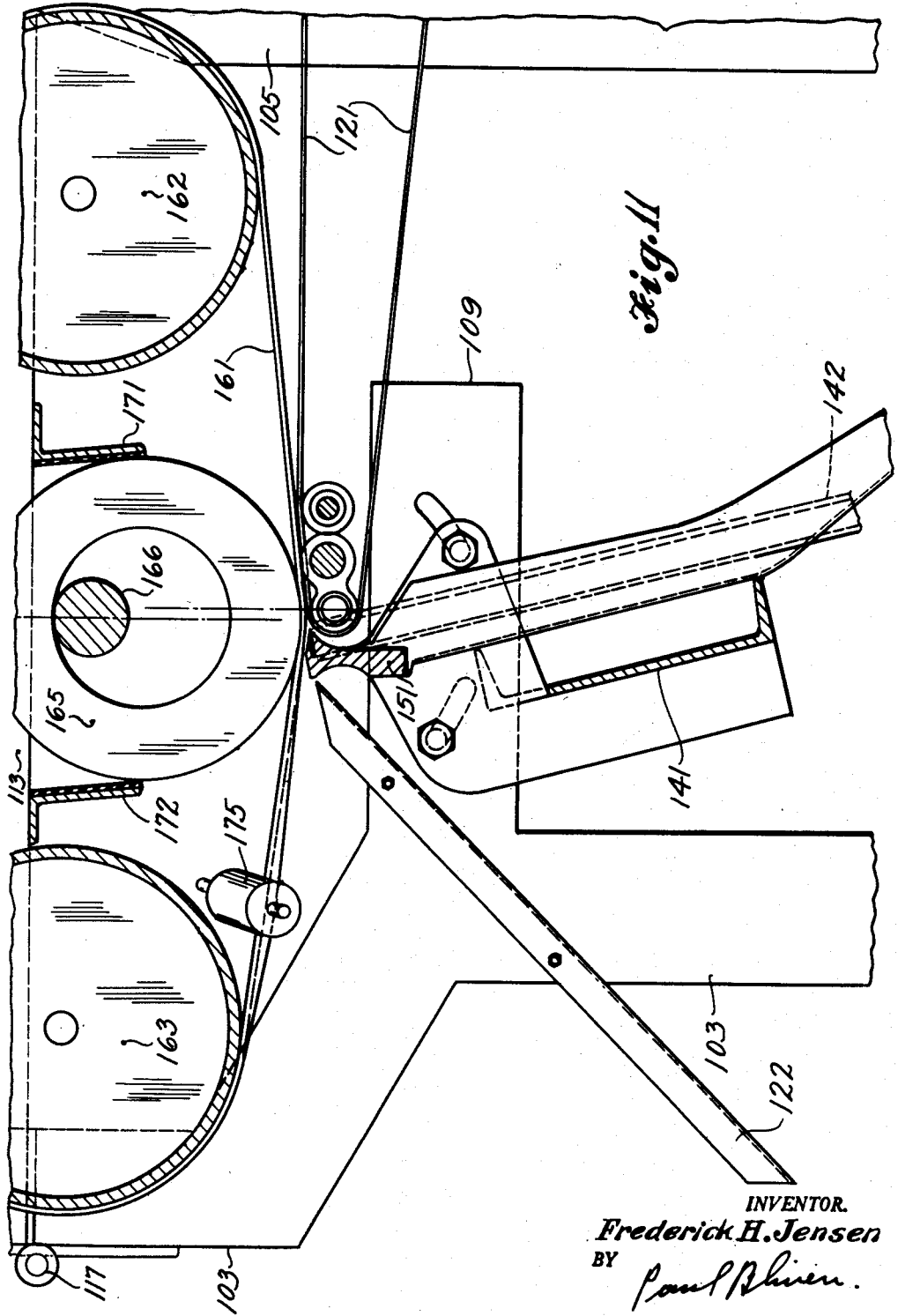
INVENTOR.
Frederick H. Jensen
BY
ATTORNEY Patented July 21, 1953

2,645,812

UNITED STATES PATENT OFFICE 2,645,812

FISH FILLET SPLITTING AND SKINNING MACHINE

Frederick H. Jensen, Seattle, Wash.

Application May 2, 1947, Serial No. 745,441

6 Claims. (Cl. 17—4)

The present invention relates to a fish fillet splitting and skinning machine and in particular to a machine having an endless knife and constant pressure, hold-down means.

In the past, the prior art has described machines using a continuous, or endless, knife for the skinning of fish fillets but, in actual practice such machines have not been satisfactory because: they have not been adaptable to production work where the fillets being skinned vary, from one to the next, in size of fillet and character of skin; they have required much hand attention; they have failed to separate the skin from the fillet; the knife and guard have offered too much obstruction to the passage of the fillet; and the pressure applied to the fillet has not been concentrated at the line of cutting and has not been uniform or constant along the line of cutting nor over the narrow area to which it has been applied.

The prior art is exemplified by the patent to Lamere, No. 2,173,336, September 19, 1939.

In the present device, the fillets are conveyed to a continuous band knife by an endless conveyor, skin-side down on the conveyor. The fillet is taken from the knife by a separate conveyor, and the knife is placed between these two conveyors with the skin being discharged therebetween, without contact with the fillet after severance. A hold-down belt contacts the upper face of the fillet and is held to the fillet by the edges of a series of thin, rigid discs which float in contact with the upper face of the hold-down belt. The axes of the discs are and remain parallel to the cutting edge of the knife and for best operation are approximately over, or just in front, thereof. The above construction and details thereof, as hereinafter disclosed, remedy the defects of the prior art here noted.

It will thus, and hereinafter, be apparent that an object of the present invention is the provision of a machine that will rapidly and cleanly skin fish fillets.

A further purpose of the present invention is the provision of a machine that will skin fillets and separate the skins therefrom.

Another object of the present invention is the provision of hold-down means for a fish fillet during the skinning thereof, that provides uniform pressure along the line of cutting and which pressure is concentrated over a narrow area of the fillet.

A further object of the present invention is the provision of a fillet skinning and splitting machine in which the knife and guide do not offer appreciable resistance to the passage of the fillet.

Yet another object of the present invention is the provision of means for the feeding of fillets to a knife, which means envelops the fillet without high pressures which tend to mash, or do mash the fillet.

Another object of the present invention is the provision of a machine that will split fillets to give thin slices, or splits, thereof.

A further object of this invention is the provision, for a thin knife, of a guide which is rigidly supported along its entire length.

Another object of this invention is the use of floating discs as a hold-down means.

A further object is the adjustment of the machine for various thicknesses of skin and fillet and that without other adjustments or changes in operation.

A machine which remedies the defects of the prior art and achieves the above objects is hereinafter described and is shown in the accompanying drawings, in which:

Fig. 2 is a plan view of the same machine;

Fig. 3 is a plan section on the line 3—3 of Fig. 1;

Fig. 4 is a transverse sectional view on the line 4—4 of Fig. 1;

Fig. 5 is an enlarged view of a portion of Fig. 4 showing the adaptation of the machine when a fillet is therein;

Fig. 6 is an elevational sectional view on the line 6—6 of Fig. 4;

Fig. 7 is an enlargement of a portion of the showing of Fig. 6;

Fig. 8 is an elevational view of the same machine but of the opposite side from that shown in Fig. 1;

Fig. 9 is a detail view of the band knife idler wheel;

Fig. 10 is a detail view of the hold-down frame;

Fig. 11 is a view similar to Fig. 7 but showing modifications of the machine.

Figure 1:
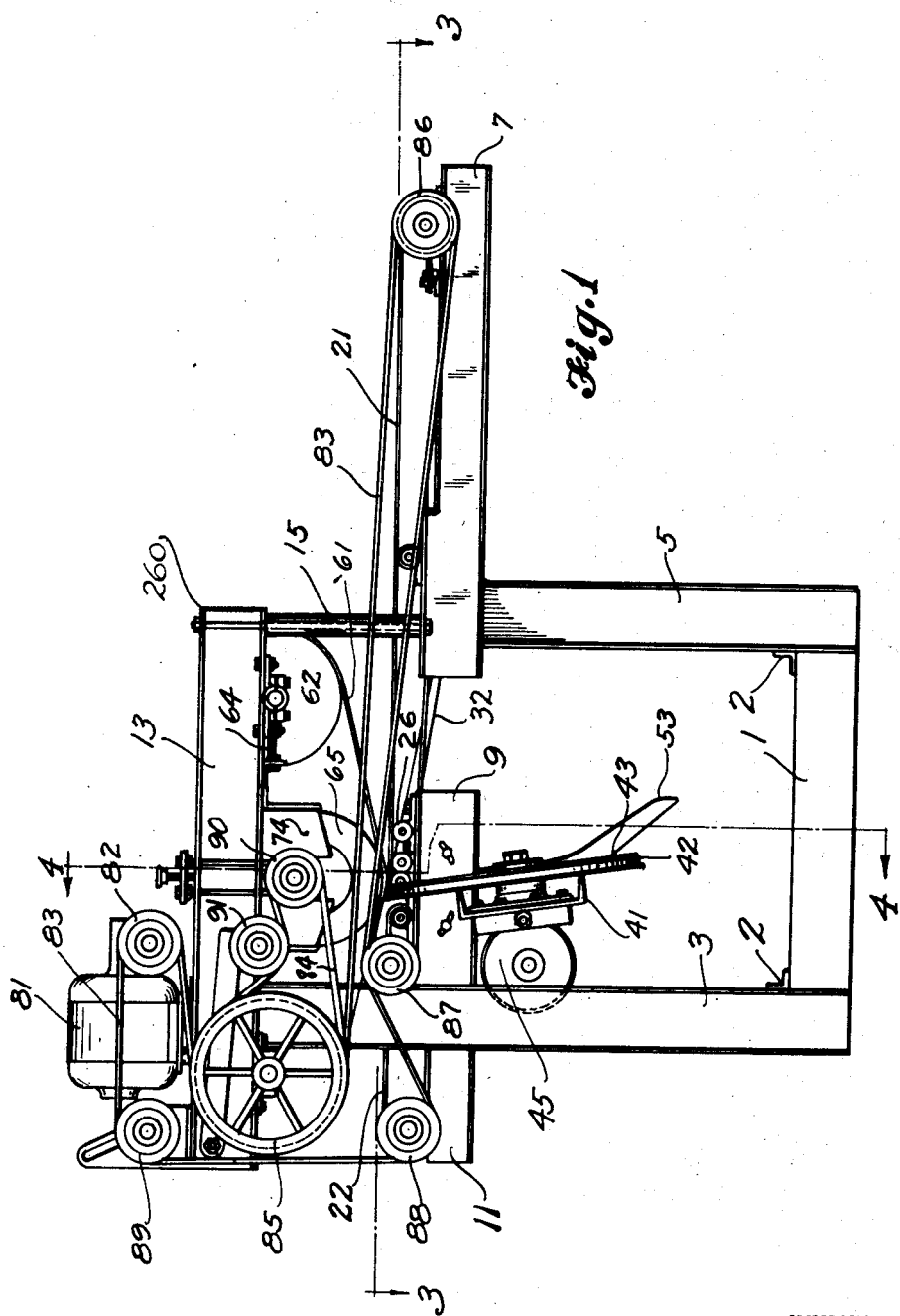
Fig. 1 is an elevational view of such a machine.

In these various views of the drawings there are shown details of the fish fillet splitting and skinning machine forming the subject matter of my present invention.

Referring to Fig. 1, that portion of the view at the right is the front, or feed, end of the machine; that portion of the view at the left is the rear, or discharge, end of the machine; the face of the machine shown in this view is the left side; and the side opposite from the left is the right side.

Base frame

In the views, the parts of the machine are supported and held in proper spaced relation by means of a frame made up largely of channel irons. The frame is divided into two parts, the base frame and the cap frame. The base frame is described first, and the cap frame is described under the heading of Hold-down assembly. Base side channels 1 and cross ties 2 hold the rear legs 3, 4, and the front legs 5, 6, of the machine in proper spacing. Supported on the front legs 5, 6, are two channels 7, 8, forming a feed belt bracket. Supported on the rear legs 3, 4, are two forwardly extending channels 9, 10, that form a knife support bracket. These brackets may be called cantilevers. Extending rearwardly from the rear legs is another pair of channels 11, 12, which form a take-away belt bracket. The rear legs 3, 4, continue above the knife and the take-away support brackets and aid in supporting, in spaced relation to these brackets, a cap frame, or pressure belt frame, having as its principal structural members two channel side rails 13, 14. These side rails overhang the rear legs 3, 4, by a short distance to the rear and a much greater distance to the front. The front ends of the side channels come about over the front legs 5, 6. These front ends of the cap frame may be supported by upward continuations of the front legs or by the use of stub braces 15, 16. As shown, each stub brace is merely a piece of pipe with a bolt passing therethrough and through the respective cap channel and feed belt bracket channel.

The conveyor

The conveyor for the fillets is made up of two parts, the feed belt 21 and the take-away belt 22. The front end, or feed end, of the feed belt is supported on the outer end of the feed belt bracket 7, 8, by a front feed belt roll 23. Each end of the roll is bearinged on the end of one of the channels making up the bracket. Near the rear of the feed belt bracket is a front feed belt idler 24. The rear of the feed belt 21 is supported by a rear feed belt roll 25. Near the front of knife supporting bracket 9, 10, is a rear feed belt idler 26. The take-away belt 22 has a front roller 27 and a rear take-away belt roller 28. The front roller for the take-away belt is bearinged on the knife support bracket 9, 10, and the rear roller for the take-away belt is bearinged on the take-away belt bracket 11, 12. Each end of the transversely positioned rear feed belt roll 25 is supported in the outer end of a crank arm 29, 30. These cranks are secured to a crank shaft 31 that is bearinged on the knife support bracket 9, 10. This crank shaft 31 has secured to its right hand end an adjusting arm 32 that is placed on the right side of the machine alongside the right side knife support channel 10 and the feed belt support channel 8. The outer end of this adjusting arm 32 is slotted and in this slot is positioned a clamping stud 33 that locks the arm in a desired position. By means of this crank support for the rear feed belt roll and the adjusting arm, the roll may be raised and lowered.

The front and rear rolls 23, 25, 27, 28, of the feed and take-away belts in supporting their respective belts form at the roll a brest. Hence, these rolls may be called brest rolls, and that portion of the belt in contact with the rolls may be called a brest of the belt. This term "brest" distinguishes these rolls and these portions of the feed belt from the idler rolls 24, 26, and those portions of the feed belt in contact with these idler rolls. The brest of the rear end feed belt roll and the contiguous portion of the feed belt may be termed the splitting brest. The splitting brest is identified generally by the letter S.

Knife assembly

The endless band knife assembly is provided with a heavy transversely positioned channel member 41 that forms a bed, or main frame member. This bed member 41 is placed crosswise of the frame of the machine and below the opposed brests of the feed and take-away belts. Each end of the bed carries a band wheel over and between which the band knife 42 is placed. The left hand wheel 43 is adjustably secured to the bed to provide a means for adjusting the tension of the knife and for slacking off the tension so the knife may be removed. The right hand wheel 44 is the drive wheel and has a drive motor 45 belted or geared to it for driving the wheels and knife. Knife speeds from five hundred to twenty-two hundred feet per minute have been used. The upper run 242 of the knife is parallel to and between the opposed brest rolls 25, 27. The cutting edge of the knife may lie just above the top surface of the feed belt at its point of tangency with the roll 25, or the edge may be below the point of tangency. The distance that the knife edge is above the feed belt is adjustable by movement of the rear brest roll 25 of the feed belt. This movement is secured through the adjustment arm 32. From the front of the machine and the edge of the knife, the top run of the band knife slopes backwardly and downwardly. This angle of slope, or cutting angle, is adjustable by supporting the bed 41 near the left end with a left cheek plate 47, and near the right end with a right cheek plate 48. Each of these cheek plates is fixedly secured to the bed and adjustably secured to one of the knife bracket channels. The securing of the cheek to the channel is by a pair of slots 49 in each cheek and a bolt 50 in each channel and passing through the contiguous slot. Manipulation of the bolt to clamp the cheek to the channel secures the blade at a desired angle. The slots 49 are arcuate with the center of the arc at the edge of the upper run of the knife blade. This means that adjustment of the angle of the blade will not change the location of the edge. The upper run of the knife is guided in its run between the opposed brest rolls by a transversely disposed knife guide 51. This guide is in the form of a T-bar with the slot 251 for the blade in the front edge of the head of the T, the stem of the T extending downwardly between the opposed brest rolls. The lower part of the stem is secured to the cheek plates 47, 48. The front side of the stem of the T is cut away to form an arcuate recess the surface of which is spaced from the feed belt as it passes over its rear brest roll 25, and this spacing provides a skin or split discharge slot 52.

Skins or splits leaving the lower side of the knife pass down the discharge slot 52 and fall on a skin chute 53 that carries the skins forward and down, clear of the lower run of the knife. This chute serves as a guard for the lower run of the knife.

The head of the guide T-bar may be separate from the remainder of the bar and may be made of suitable bearing material. A material which has proved satisfactory is a rather hard carbon block. This material is not affected by moisture and has good bearing and wear characteristics. Certain bronze alloys have also proved satisfactory. The bed, wheels, knife, and drive are similar to those used in some metal sawing machines. Satisfactory service has been had from metal cutting band saw blades which have been re-sharpened to give a smooth knife edge. Chromium plating of the blade increases the life of the edge.

Hold-down assembly

The rectangular superimposed cap frame 260 composed of two side channel members 13, 14, supported on top of the machine, supports the hold-down mechanism. This hold-down mechanism, in cooperation with the feed belt 21, secures the fish and forces it against the knife. This hold-down mechanism may be called the cap mechanism.

A hold-down, or cap, belt 61 which is endless, passes around a front cap drum 62 and a rear cap drum 63. The axles for these drums are fitted at their ends in bearings secured to the cap side channels 13, 14. The position of the front cap drum 62 along the cap frame is adjustable by means of slotted bolt holes for the bolts holding the bearings to the frame, and by an adjusting screw 64 secured between the frame and each of the front cap drum bearings.

When the machine is empty, that is, when no fillets are passing therethrough, the cap belt is held in fixed spaced relation to the knife and the feed belt. This spaced relation of the cap belt, knife and feed belt may be and is adjustable but, when adjusted, it must be a fixed minimum. The spacing may automatically increase to allow the passage of a fillet, but uncontrollable decreases in the spacing would allow the knife to cut into the cap belt. This spacing of the lower section of the cap belt from the knife and its opposition thereto is had by a series of annular discs 65. These discs are parallel to each other, their flat faces are contiguous, they have a common axis when the machine is empty, a portion of the edge, or periphery, of each is in contact with the upper face of the lower run of the cap belt, the axis of the discs is parallel to the edge of the knife in its upper run, the lowest part of the discs is adjacent to the knife edge, and the discs float up and down free of each other.

The discs 65, when assembled, form a flexible cylinder, which may carry the same reference number 65. These discs form, in effect, a sectionalized follower roller which is yieldable upward to conform to the varying contour of the fillet as it passes thereunder. In the present use of the word "flexible" it is desired to limit the concept to those yieldable mechanisms or materials where the force needed for deformation is a constant, regardless of the amount of deformation, and is not a function of the displacement as in an elastic rubber body.

In the present device the pressure is substantially constant regardless of fillet thickness, whereas, with soft rubber rolls the pressure varies as the displacement, or the thickness of the fillet.

The discs are held in their minimum spaced position relative to the knife by a disc support shaft 66 which passes through the discs from one side of the cap frame to the other. This shaft has its ends supported in hanger bearings 67, 68, that are adjustably secured to the cap side channels 13, 14, by means of hanger rods 69 that pass upwardly through the flanges of the channels, and by adjusting screws 70 that act between each of the cap channels and the pair of hanger rods supporting each bearing. The inner edge of the discs 65 ride on this shaft 66 when the machine is empty and thus the discs and belt 61 are supported in fixed minimum relation to the knife. The hold-down pressure may be varied by changing the radial thickness of the discs, by the composition of the discs, or by interspacing discs of various densities.

Movement of the discs along the belt 61 is prevented by means of the guides 71, 72, that are secured to the underside of and across the cap frame. The opposed faces of these guides are parallel. The faces may be covered with a suitable fiber or bearing material 73 that will allow the discs to readily slip thereon. An end guard 74 placed at each end of the cylinder 65 holds the faces of the discs together. When a fillet passes through the machine, the discs over the fillet move up and down between their guides. Each disc moves only enough to adapt itself to the particular contour below it. This movement is independent of the contiguous disc. The discs may be said to float on the belt and the fillets. The discs, through the contiguous cap belt, maintain even pressure upon and across a fillet. This pressure is applied along a line, and this is so even if the fillet is distorted by this line contact. This line of pressure is to be distinguished from the pressure area which would result if a soft rubber roll were to be used instead of the present flexible cylinder composed of rigid discs.

The position of the pressure line with respect to the knife edge is adjustable by forward or backward movement of the cap frame on its supports 3, 4, 15, 16. In practice, very satisfactory operation has been had with the pressure line an eighth to a quarter inch in front of the knife edge. It is felt that less lateral pressure is applied to the knife if the pressure line is ahead of the edge than if it is just at, or behind, the edge, and that such lessening of the lateral pressure is desirable.

The cap belt may have some longitudinal stretch, as with a rubber belt with cotton fibers. Using such a belt, the cap drums 62, 63, may have a slight crown to obtain proper tracking of the belts. In Fig. 7 the dotted line showing of a disc represents the raised position of a disc when a fillet 75, dotted showing, is passing through the machine. The dotted line position of the cap belt also depicts the position of the longitudinal filament of the belt under the dotted-line raised disc. The skin 76 as it is cut from the fillet is shown traveling down the discharge slot 52 and skin chute 53. Fig. 5 is a cross-section showing the conforming of the pressure line to a fillet. It is to be noted that laterally the belt conforms very closely to the contour of the fillet but that longitudinally the conformation is less. However, both laterally and longitudinally the conformation of the belt to the fillet is very close. The longitudinal conformation is explained by the discs at the sides of the fillet holding down the edges of the belt, which sets up some transverse tension in the belt and pulls the belt down around the ends of the fillet. This transverse tension set up by the lower side discs pulls down the belt filaments running under the higher center discs. The pulling down of the high center filaments is exerted over a considerable longitudinal distance.

This close conformation of the belt to the fillet is greatly enhanced by the construction of the hold-down belt. The cotton fibers embedded in the rubber belt are arranged longitudinally of the belt in parallel strands which are not cross connected. The effect is that of a multiple rope drive as compared to a canvas belt drive. These parallel unconnected strands allow the belt to stretch laterally to a considerable extent, yet they do not allow a material longitudinal stretch. This, in turn, allows very close lateral conformation of the belt to the fillet. The strands may be composed of one or more fibers.

*Drive means*

The drive means for the band knife has already been described in connection therewith.

The primary drive means for the conveyor, cap belt, and flexible cylinder is an electric motor 81 mounted on and above the cap frame at the rear. The motor shown in the drawings has a built-in gear reducer but any suitable reduction means may be employed. The speed at which the conveyors are to operate may be varied within wide limits, as yet no maximum has been reached, although machines have been run with conveyor speeds of thirty to one hundred and fifty feet a minute satisfactorily. The present limitation on speed has not been that of the machine but the means to feed properly positioned fillets to the machine. The motor 81 delivers its power through a sheave 82. Power is passed from the motor sheave to the various parts of the machine through a main drive V-belt 83 and an auxiliary drive V-belt 84 which drives the disc support shaft 66. Following the main belt against its direction of motion, it passes from the motor drive sheave 82 to a cap drum sheave 85 that is secured on the axle of the rear cap drum 63. This sheave 85 is double, one groove carrying the main drive belt 83 and the other groove carrying the auxiliary drive belt 84. From the cap drum sheave the drive belt passes forward the length of the machine to a sheave 86 secured to an end of the front feed belt roll 23. From the front roll the drive belt passes to an idler sheave 87 located behind and above the upper run of the knife, to guide the drive belt in clearing the knife. From the idler 87, the drive belt passes to the rear take-away roll 28 and drive sheave 88 secured to an end of the roll. From the take-away drive, the belt passes up to an adjustable idler sheave 89 which is mounted on the rear of the cap frame and in back of the motor. This completes the circuit of the main drive belt.

The auxiliary drive belt 84 receives its power from the double sheave 85 which drives the cap belt. The tension run of this belt passes directly to a sheave 90 mounted on an end of the flexible cylinder support shaft 66. The slack side of the auxiliary belt passes under an idler sheave 91 that maintains the proper tension on the belt. The various sheaves, rollers and drums are so proportioned that the feed belt, take-away belt and hold-down belt have the same velocity. The drive for the hold-down discs gives them this same velocity.

*Operation*

To operate the present machine, power is supplied to the band knife motor 45 and the conveyor drive motor 81. The speed of the conveyor may be thirty feet per minute and upward. The speed of the band knife may be five hundred feet per minute and upward. Speeds up to two thousand feet per minute have been found satisfactory, but the lower speeds are better. It has been found very desirable to supply a small quantity of water to the face of each of the belts This water continually washes away the slime and refuse found attached to fish skins which transfers to the belts. Squeegees may be used to doctor the belts. The method of supplying water and squeegeeing the belts has not been illustrated, as such equipment is obvious.

The distance between the knife edge and the adjacent brest of the feed belt 21 is adjusted for the particular kind of fish fillet to be processed. Fish skins vary considerably in thickness. Also, it may be desirable to remove more or less of the dark oily meat lying between the skin and the main portion of the fillet. This adjustment is had by moving the adjusting lever 32, which in turn raises and lowers the brest roll 25. In actual operation, some adjustment of the cutting angle of the knife may be made by swinging the knife bed 41 and cheeks 47, 48, along the arcuate slots 49, and clamping the same in place with the locking bolts 50.

Fillets are placed on the feed belt 21 with the skin side against the belt. Usually, the tail end is placed toward the rear of the machine so that the cutting action starts with the tail end. However, it has been found that the machine operates satisfactorily, no matter how the fillets are placed on the belt, as long as they are flattened out with the skin in contact with the belt. This is particularly true for thin fillets. As the fillet is carried along the feed belt, the top surface of the fillet comes in contact with the hold-down, or cap, belt. Further progress of the fillet causes the pressure discs 65 to rise, and the feed and cap belts to firmly grasp and envelope the fillet as it is brought into contact with the knife. In its passage over the knife, the fillet 75 is parted from its skin 76 which slides away and is carried down the skin discharge slot 52 and skin chute 53. The skinned fillet is picked up by the take-away belt 22 and carried therealong and over the rear brest roll 28 of the feed belt where it falls into a suitable receptacle or upon another conveyor.

The operation of the machine for splitting fillets is the same as for skinning, except that the slice removed is usually thicker than the usual thin skin thickness.

The band knife 42 is removed from the machine by unbolting from the frame the bearings for the crank shaft 31 and the feed belt rear idler 26. This allows removal of the feed belt and its supports from the knife assembly support bracket 10, 11. When the idler wheel 43 of the knife assembly is slackened off, the band knife 42 may be removed over the free end of the knife assembly support bracket 10, 11. A band knife is placed on the machine in a manner evident from the above disclosure.

*Modification*

Figure 11 is a sectional view taken in a manner and on a scale similar to Figure 7. This view incorporates various features which illustrate somewhat the manner in which the machine may be modified and still retain the principal features of the present invention.

The frame of the machine has been modified by offsetting the rear legs 103 above the knife support bracket 109, to the rear of the machine so as to attach to the cap frame 113 at the rear end thereof. The front legs 105 are also carried past the feed belt bracket to the cap frame 113. The cap frame is joined to each of the rear legs by a hinge 117. This construction allows the front end of the cap frame to raise off the front legs and be swung over and back to give easy access to the knife and belts.

The arrangement of the conveyor belt 121 is similar to that previously described. The take-away conveyor is in the form of a chute 122. The weight of the fillet is sufficient, in this case, to pull it clear of the knife 142 and its guide 151 so that it may fall down the chute. The chute is at an angle of about 45° down which the fillets easily slide.

The knife bed 141 and the rest of the knife assembly are the same as previously described.

The hold-down assembly frame has been changed in this modification as above noted. The assembly has been further modified by raising the flexible cylinder 165 and its discs so that the lower run of the hold-down belt 161 is flatter, and by lowering the whole cap frame. This reduces the angle between the feed belt and the cap belt, and the angle between the take-away belt and the cap belt. This reduction in the angle between the belts increases the envelopment of the fillet as it passes over the knife. However, it is to be noted that the pressure on the fillet is not increased to obtain this increased envelopment. This is a very advantageous feature of machines herein described, that is, the angle between the belts may be changed, the envelopment changed, and the pressure on the fillet kept constant.

The disc guides 171, 172, have been slanted so that the sliding friction of the discs on the rear guide 172 and the weight of the discs give a component that is approximately normal to the face of the guides. This component of the discs against the rear disc-guide 172, may be reduced by dropping the center of the front cap drum 162 below that of the rear cap drum 163. Such a construction may remove the need for driving the disc support shaft 166.

Guide rollers 175 have been placed on the hold-down belt 161 as it has been found that with the use of guide rollers 175 placed one on each edge of the belt and opposite each other, that good trackage of the belt with modified crowning of the drums may be had. These rollers 175 need be only four or five inches in length and an inch or so in diameter. These rollers are placed so that each raises the edge of the belt a small amount and contacts the belt inwardly only an inch or two. The inner, or adjacent end, of paired, opposite, rollers are raked in the direction of travel of the belt. This arrangement of the rollers causes each of them to crowd the belt toward its center line and when the crowd of each roller equals its opposite roller, the belt is stable. It has been found that these guide rollers are very effective in preventing the belt from hunting across the drum or roll faces. It is to be realized that the axes of the drums and rolls around which the belts are guided must be parallel if satisfactory operation is to be had.

The guide rollers 175 are very desirable if the parallel unconnected filaments, or strands, embedded in the hold-down belt are of a relatively inelastic material such as certain rayons or glass. These materials require that the crown of the drums be very flat. If the drums have very much crown, the belt will ride only on the center portions of the drums.

The operation of this modification is substantially the same as the machine previously disclosed. The hinging of the cap frame allows easier change and servicing of the band knife, and cleaning of the belts and discs.

Having thus described my invention, I claim:

1. In a splitting and skinning machine, a base frame including a pair of spaced, parallel, vertically disposed front and rear legs, a pair of horizontally disposed channels supported on said front legs and providing a feed belt bracket, channels supported on said rear legs providing a knife support and take-away bracket, a conveyor including a feed belt and rollers supported on said feed belt bracket, a front roller and a rear roller supported on said knife-support bracket, a take-away belt trained over said front and rear rollers, an endless band knife assembly comprising a bed arranged below said belts, a pair of wheels mounted on said band and one of said wheels adapted to be connected to a power source, an endless knife trained over said wheels, and a guide for said knife providing a skin-discharge slot, said knife being arranged transversely of said belts and being arranged contiguous to the adjacent ends of said belts.

2. In a splitting and skinning machine, a base frame including a pair of spaced, parallel, vertically disposed front and rear legs, a pair of horizontally disposed channels supported on said front legs and providing a feed belt bracket, channels supported on said rear legs providing a knife support and take-away bracket, a conveyor including a feed belt and rollers supported on said feed belt bracket, a front roller and a rear roller supported on said knife-support bracket, a take-away belt trained over said front and rear rollers, an endless band knife assembly comprising a bed arranged below said belts, a pair of wheels mounted on said band and one of said wheels adapted to be connected to a power source, an endless knife trained over said wheels, and a guide for said knife providing a skin-discharge slot, said knife being arranged transversely of said belts and being arranged contiguous to the adjacent ends of said belts, and a skin chute for receiving the skins from said slot.

3. In a fish skinning machine, the combination which comprises a frame, crank arms pivotally mounted in the frame, a feed belt bracket extended from the frame, a transversely positioned rear feed belt roll mounted in said crank arms, a front feed belt roll mounted in said bracket, a longitudinally disposed conveyor feed belt trained over said transversely positioned rear feed belt roll and also over the front feed belt roll, a transversely disposed vertically positioned knife guide substantially T-shaped in cross section mounted in the frame, spaced from the rear feed belt roll and the feed belt thereon, and having a knife slot therein, a transversely positioned channel member adjustably mounted in the frame and having end sections extended from the frame, band wheels positioned on opposite sides of the frame and mounted on the extended end sections of the channel member, an endless band knife trained over said wheels and having an upper run extended through the machine, said wheels and channel member being positioned whereby the upper run of the knife travels in said slot of the knife guide, said knife guide having an arcuate recess positioned below the knife slot and said guide positioned whereby the arcuate recess coacts with the rear feed belt roll of the conveyor feed belt to provide a discharge slot, a hold-down belt positioned above the conveyor and knife for carrying products from the feed belt over the knife, and means for receiving products from the knife.

4. In a fish skinning machine, the combination which comprises a frame, crank arms pivotally mounted in the frame, a feed belt bracket extended from the frame, a transversely positioned rear feed belt roll mounted in said crank arms, a front feed belt roll mounted in said bracket, a longitudinally disposed conveyor feed belt trained over said transversely positioned rear feed belt roll and also over the front feed belt roll, a transversely disposed vertically positioned knife guide substantially T-shaped in cross section mounted in the frame, spaced from the rear feed belt roll and the feed belt thereon, and having a knife slot therein, a transversely positioned channel member adjustably mounted in the frame and having end sections extended from the frame, band wheels positioned on opposite sides of the frame and mounted on the extended end sections of the channel member, an endless band knife trained over said wheels and having an upper run extended through the machine, said wheels and channel member being positioned whereby the upper run of the knife travels in said slot of the knife guide, said knife guide having an arcuate recess positioned below the knife slot and said guide positioned whereby the arcuate recess coacts with the rear feed belt roll of the conveyor feed belt to provide a discharge slot, a hold-down belt positioned above the conveyor and knife for carrying products from the feed belt over the knife, means in the hold-down belt for compensating for uneven thicknesses of products between the hold-down belt and knife, and means for receiving products from the knife.

5. In a fish skinning machine, the combination which comprises a frame, crank arms pivotally mounted in the frame, a feed belt bracket extended from the frame, a transversely positioned rear feed belt roll mounted in said crank arms, a front feed belt roll mounted in said bracket, a longitudinally disposed conveyor feed belt trained over said transversely positioned rear feed belt roll and also over the front feed belt roll, a transversely disposed vertically positioned knife guide substantially T-shaped in cross section mounted in the frame, spaced from the rear feed belt roll and the feed belt thereon, and having a knife slot therein, a transversely positioned channel member adjustably mounted in the frame and having end sections extended from the frame, band wheels positioned on opposite sides of the frame and mounted on the extended end sections of the channel member, an endless band knife trained over said wheels and having an upper run extended through the machine, said wheels and channel member being positioned whereby the upper run of the knife travels in said slot of the knife guide, said knife guide having an arcuate recess positioned below the knife slot and said guide positioned whereby the arcuate recess coacts with the rear feed belt roll of the conveyor feed belt to provide a discharge slot, a superimposed cap frame having side channel members positioned above said frame, front and rear cap drums mounted on said channel members of the superimposed cap frame, a cap belt, having a lower section, trained over said front and rear drums, a plurality of vertically movable floating discs positioned to rest upon the lower section of said cap belt for flexing the belt to compensate for unevenness of products passing from the feed belt over the knife, and means for receiving products from the knife.

6. In a fish skinning machine, the combination which comprises a frame, crank arms pivotally mounted in the frame, a feed belt bracket extended from the frame, a transversely positioned rear feed belt roll mounted in said crank arms, a front feed belt roll mounted in said bracket, a longitudinally disposed conveyor feed belt trained over said transversely positioned rear feed belt roll and also over the front feed belt roll, a transversely disposed vertically positioned knife guide substantially T-shaped in cross section mounted in the frame, spaced from the rear feed belt roll and the feed belt thereon, and having a knife slot therein, a transversely positioned channel member adjustably mounted in the frame and having end sections extended from the frame, band wheels positioned on opposite sides of the frame and mounted on the extended end sections of the channel member, an endless band knife trained over said wheels and having an upper run extended through the machine, said wheels and channel member being positioned whereby the upper run of the knife travels in said slot of the knife guide, said knife guide having an arcuate recess positioned below the knife slot and said guide positioned whereby the arcuate recess coacts with the rear feed belt roll of the conveyor feed belt to provide a discharge slot, means adjusting the positions of the crank arms for adjusting the rear feed belt roll in relation to the knife, a superimposed cap frame having side channel members positioned above said frame, front and rear cap drums mounted on said channel members of the superimposed cap frame, a cap belt having a lower section trained over said front and rear drums, a plurality of vertically movable floating discs positioned to rest upon the lower section of said cap belt for flexing the belt to compensate for unevenness of products passing from the feed belt over the knife, and means for receiving products from the knife.

FREDERICK H. JENSEN.

References Cited in the file of this patent

UNITED STATES PATENTS

| Number | Name | Date |
|---|---|---|
| 1,805,177 | Hodnett | May 12, 1931 |
| 1,813,479 | Barry | July 7, 1931 |
| 1,993,899 | Rieske | Mar. 12, 1935 |
| 2,107,013 | Morgan | Feb. 1, 1938 |
| 2,173,336 | Lamere et al. | Sept. 19, 1939 |
| 2,254,860 | Rose | Sept. 2, 1941 |
| 2,256,756 | Brown | Sept. 23, 1941 |

FOREIGN PATENTS

| Number | Country | Date |
|---|---|---|
| 73,573 | Sweden | Feb. 9, 1932 |